Inventor
Jean Knus
By
Watson, Cole, Grindle & Watson
Attys.

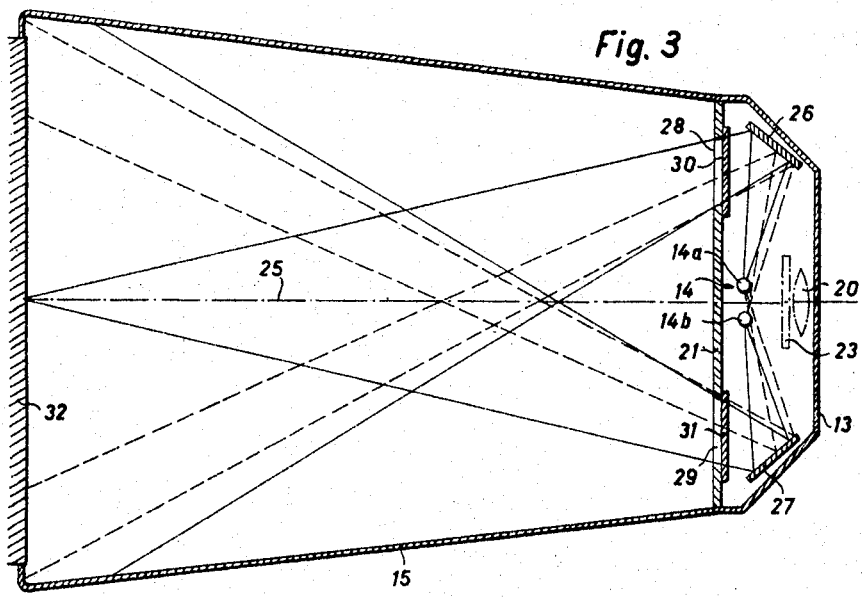
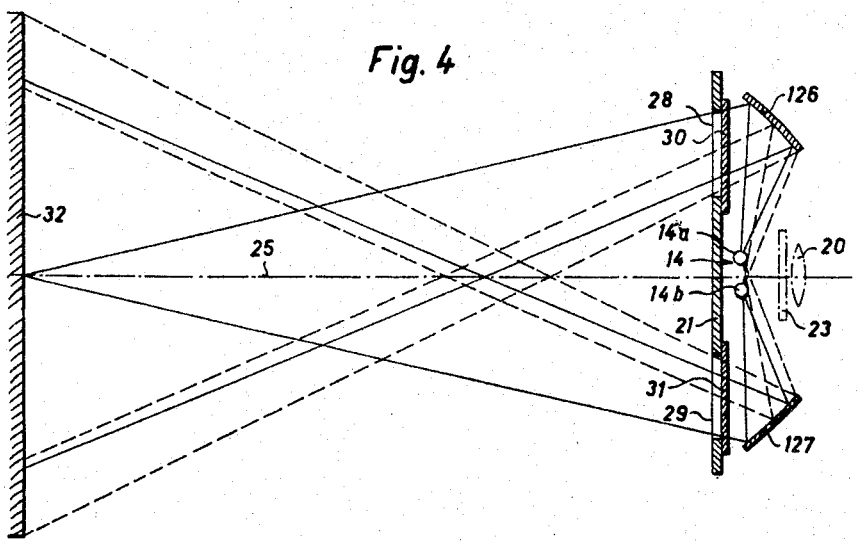

United States Patent Office 3,263,584
Patented August 2, 1966

3,263,584
APPLIANCE FOR ILLUMINATING AND PHOTO-GRAPHING A SURFACE OF AN OBJECT WITH REFLECTING AREAS
Jean Knus, Zurich, Switzerland, assignor to Alos AG, Zurich, Switzerland
Filed Jan. 21, 1963, Ser. No. 252,809
Claims priority, application Switzerland, Jan. 22, 1962, 814/62
6 Claims. (Cl. 95—11)

This invention relates to an appliance for illuminating and photographing a surface of an object with reflecting areas, preferably for recording the indication of meters photographically.

It is known that the reflectionless illumination of a surface of an object with reflecting areas, such as the covering glasses or windows of meters, causes considerable difficulties. By using polarizing filters with intersected planes of oscillation, disturbing light reflections and radiation may certainly be avoided to a great extent, but direct reflections of the light sources on a reflecting surface cannot be entirely suppressed because of the incomplete obliterating of intersected filters.

To avoid such reflections, provision has been made for arranging two light sources at a fairly great distance apart on either side of the optical axis of the still camera, in order that relatively flat angles of incident light arise and the reflections certainly fall outside the field of view of the camera. But with such a solution there results an unhandy and bulky apparatus, and in addition disturbing heavy shadows frequently occur at the objects to be photographed because of the flat incidence of light.

It is further known to build the still camera and two light sources on either side of its optical axis into one common casing and to arrange stopping down means for the light sources, thus ensuring that these emit two cones of light each illuminating the surface of the object only up to the middle, the axes of the cones of light intersecting in front of the still camera. The light source arranged at the righthand side of the camera then only illuminates the lefthand half of the object surface, while the lefthand light source illuminates only the righthand half.

All arrangements with two or more light sources are affected by the drawback, that the illumination is not always uniform because of differing light emission and ageing of the light sources. Even two flash tubes selected in respect of identical lighting performance do not always emit the same quantities of light during their service life. In addition, for two flash tubes, a larger feed appliance is required than for one single tube.

These drawbacks are obviated in a likewise known arrangement, in which a single electronic flash tube with linear discharge zone is so mounted that the discharge zone of the tube is in the vicinity of the camera lens in a plane passing through the optical axis of the camera. Thereby provision is made for means adapted to fix the lighting equipment with respect to the surface of the object so that the mirror image, possibly not to be avoided, appears at a place on the object to be photographed, where it causes the least disturbance or none at all. Practice has shown that this aim cannot always be accomplished under all circumstances, because often some of the reflecting surfaces are uneven or do not exactly run at right angles to the optical axis of the camera, for which reason the mirror image of the flash tube comes to lie partly on undesired places of the photographic picture.

Now the object of the instant invention is to eliminate all the described disadvantages of the arrangements known heretofore.

The appliance according to the invention comprises in known manner a fixture for the still camera, an electronic flash tube, polarizing filters with intersected planes of oscillation and arranged in front of the camera lens and flash tube, together with the stopping-down means allocated to the flash tube.

The novelty of the object of invention essentially consists in that the lighting equipment includes one single electronic flash tube which is arranged behind the stopping-down means symmetrically with respect to the plane containing the optical axis of the camera, that said means prevent direct illumination at least of the middle portion of the surface of the object by the electronic flash, and that on either side of said plane and symmetrical thereto deviating mirrors are provided adapted to throw the light emitted from the flash tube in intersecting cones of light onto the surface of the object.

Other details and their merits will appear from the following description and claims, taken in conjunction with the accompanying drawings, wherein there are shown, purely by way of example, some forms of embodiment incorporating the invention.

FIG. 3 shows a horizontal longitudinal section on the line III—III of FIG. 2 on a smaller scale, with indicated paths of rays of the lighting equipment;

Figure 5:
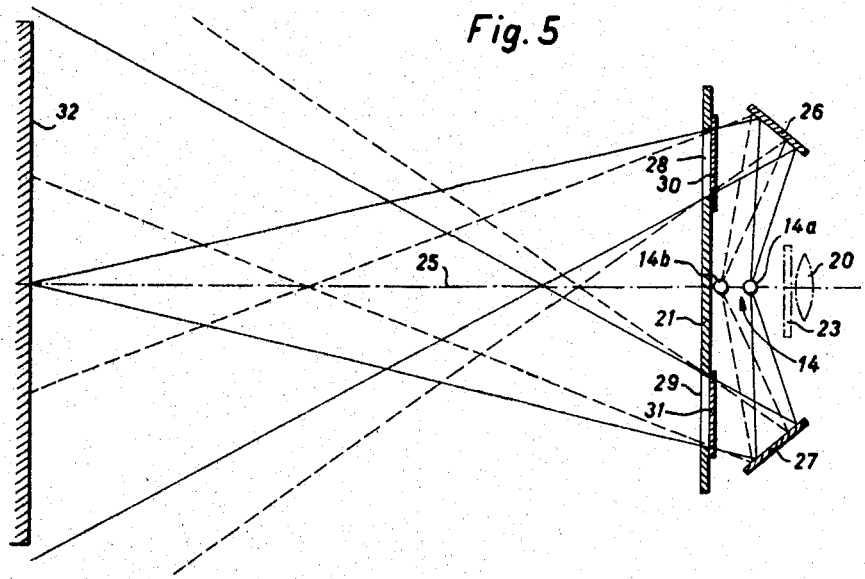
Figure 6:
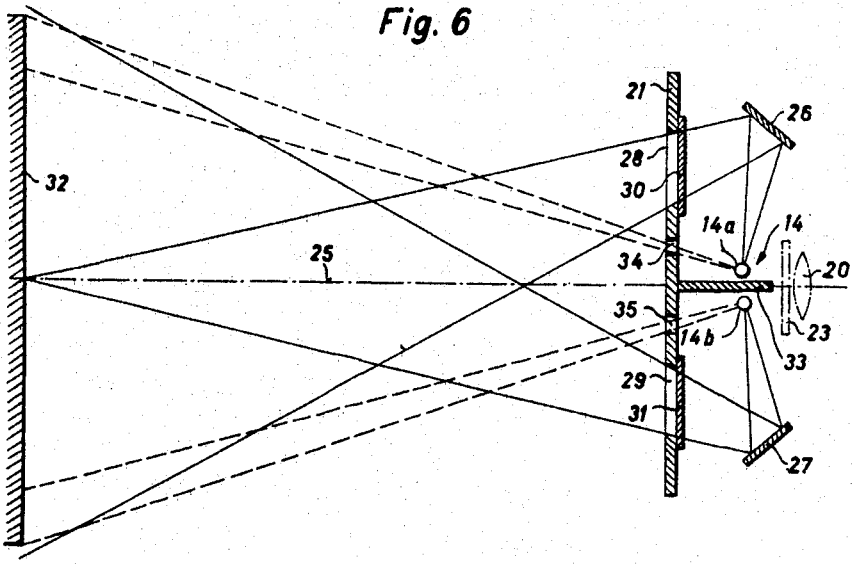

FIGS. 4, 5, 6 each show in similar representation a different form of embodiment, the equipment casing being omitted for the sake of clarity.

Figure 1:
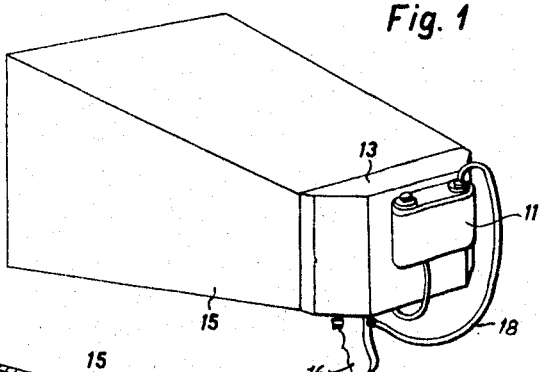
FIG. 1 shows in perspective representation an external view of the appliance.
Figure 2:
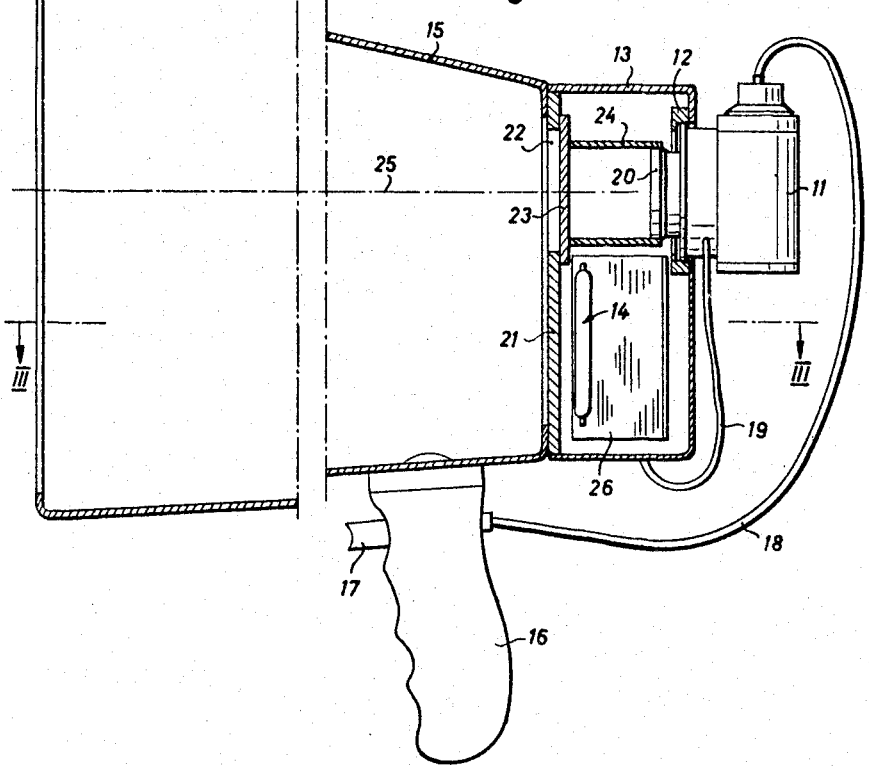
FIG. 2 shows the same appliance in vertical longitudinal section and on a larger scale.

Referring to FIGS. 1–3, the appliance illustrated includes a commercial miniature camera 11, but it is understood that for instance a substandard film camera or any suitable camera could be provided instead. By means of a holder 12 the camera 11 is removably mounted on a casing 13 which accommodates a lighting equipment with a single electronic flash tube 14 and is located at the rear end of a focussing hood 15. Attached to the focussing hood is a so-called pistol handle 16 with which the appliance can be manipulated by one hand. The handle 16 has a trigger 17 which is connected to the release of the camera 11 via a Bowden cable 18. A synchronous contact of the camera shutter is associated with the feed device (not shown) for the flash tube 14 via an electric cable 19, in order to actuate the flash automatically at each exposure.

In the range of the camera holder 12, the rear wall of the casing 13 is provided with an opening through which the lens 20 of the camera 11 projects into the casing. Towards the focussing hood 15 the casing 13 is closed by a wall 21. The latter has an opening 22 with a polarizing safelight screen 23 set with respect to the lens 20, through which screen the exposures must be made. To prevent direct incidence of light from the flash tube 14 into lens 20, the latter has set on it a tube 24 reaching up to the safelight screen 23.

At the end remote from the camera 11, the focussing hood 15 is open and formed in such a way as to frame an area which, with respect to size and dimensions, is only slightly larger than the surface of the object photographed at each exposure.

The flash tube 14 is located beneath the tube of the camera lens 20, in fact behind the wall 21 and symmetrical to the vertical plane including the optical axis 25 of the camera. The wall 21 is a stopping-down means adapted to prevent incidence of light from the flash tube 14 to the surface of the object being illuminated at the open end of the focussing hood 15.

The flash tube 14 is substantially U-shaped and so arranged that its two U-legs 14a and 14b (FIG. 3) on either side of the vertical plane including the optical axis 25 run parallel thereto. Likewise arranged symmetrical to said vertical plane in casing 13 are two lateral plane deviating mirrors 26 and 27 which are inclined to the optical axis 25 at an angle between 30° and 60°. In the design according to FIG. 3, the inclination is about 40°. In the range of the mirrors 26, 27, the wall 21 has two apertures 28 and 29, each with a polarizing safelight screen 30 and 31 respectively. These polarizing filters 30, 31 have the same planes of oscillation which, however, are intersected at right angles to the plane of oscillation of the polarizing filter 23 arranged in front of the camera lens 20. The deviating mirrors 26, 27 throw the light emitted from the flash tube 14, in cones intersecting in front of the lens 20, onto the surface of the object to be illuminated.

In FIG. 3 an object, whose front shall be photographed, is designated 32; this being for instance a block of conversation tax meters in a telephone system. The paths of rays plotted in FIG. 3 show that the light deviated by mirror 26 at the right, only illuminates the lefthand half of the surface of the object up to the middle, i.e. up to the vertical plane including the optical axis 25, whereas the light deviated by mirror 27 at the left, only illuminates the righthand half of the surface of the object up to the middle. The margins of the apertures 28 and 29 limit the cones of light laterally. Each cone of light shown in full lines has its origin in that leg of the flash tube 14 which is nearest the respective mirror 26 or 27. The other leg of the flash tube 14 delivers an additional cone of light, which is shown in broken lines and serves for brightening the extreme marginal portion of the respective half of the surface of the object, to compensate for drop in brightness to the outside, of the cone of light shown in full lines. Thus, both legs 14a and 14b of the flash tube emit light to each of the deviating mirrors 26 and 27.

All light rays fall onto the surface of the object 32 being photographed at such angles of incidence that, upon a reflection, they cannot reach the lens of camera 11. The polarizing filters 23, 30 and 31 respectively with intersected planes of oscillations, additively ensure that the exposure is free from reflections which could arise owing to unevennesses of the reflecting surfaces of the object 32 or due to inaccuracies in guiding the rays of the appliance, for instance because of not strictly linear design of the light source of each leg of the flash tube.

The form according to FIG. 4 differs from the one described hereinbefore only in that instead of plane deviating mirrors 26 and 27, there are now provided concave deviating mirrors 126 and 127 whose portions lying nearer the optical axis 25 have a greater angle of inclination to the optical axis. In this way sharper focussing can be achieved of the cones of light which fall onto the object 32 being photographed, so that, for the same brightness of the surface of the object, less light performance of the flash tube 14 is required. The paths of rays plotted in FIG. 4 show that the cones of light shown in full and in broken lines fall substantially onto the object 32 side-by-side. Each of the cones of light shown in full lines has its origin in that leg of the flash tube 14 which is nearer the respective deviating mirror 126 or 127, whereas the cones of light shown in broken lines, emanate from the other leg of the flash tube. Also in this embodiment the cones of light, which are deviated by the mirrors 126 and 127, intersect in front of the lens 20 of the camera.

FIG. 5 illustrates a form, in which again provision is made for plane deviating mirrors 26 and 27. The difference from the first form lies in a modified arrangement of the U-shaped flash tube 14. This likewise is located behind the wall 21 adapted as stopping down means, so that no direct light rays from the flash tube can fall onto the object 32. But the two legs 14a and 14b now lie in the vertical symmetrical plane of the appliance, including the optical axis 25 of the camera 11. Each leg 14a and/or 14b emits light to both deviating mirrors 26 and 27, whereby the rear leg 14a produces the cones of light which are shown in full lines, each illuminating the object up to the middle, i.e. up to the vertical plane through the optical axis 25. The front leg 14b produces the cones of light which are shown in broken lines and illuminate and brighten the outer marginal portions of the surface of the object additionally. The cones of light deviated by mirrors 26 and 27 again intersect in front of the camera lens 20.

In the form shown in FIG. 6, flash tube 14 and deviating mirrors 26 and 27 are identical in design and arranged as in the first form of embodiment. But interposed between the two U-legs 14a and 14b of the flash tube there is a stopping-down shield 33 which causes that light falls upon each of the mirrors 26 and 27 only from one or the other leg 14a or 14b, whereby the cones of light shown in full lines form, which intersect in front of the lens and each illuminate the object up to the middle. For brightening the outer marginal portions of the surface of the object, additional cones of light shown in broken lines are employed, which pass through slits 34 and 35 in wall 21 and are sent from one or the other leg of the U-shaped flash tube 14 direct to the object 32, without going over the deviating mirrors 26 and 27. As these additional cones of light are directed only onto the outer marginal zones of the object 32, it is not necessary that they intersect in front of the lens 20, since their angles of incidence on the front of the object are such that no reflection into the lens 20 can take place. If desired, polarizing safelight screens 30 and 31 may reach up to before the slits 34 and 35, in order that the additional light for brightening the marginal zones also becomes polarized.

Through the instant invention an appliance for illuminating and photographing surfaces of objects with reflecting areas is created, which certainly avoids disturbing reflections being formed on the photographic picture, manages with one single flash tube, is comparatively simple in design, is compact and handy. Because only one flash tube is provided, there is no risk that upon replacing this tube by a new one or simply because of ageing, the illumination of the two halves of the surface of an object becomes different.

What I claim is:

1. Appliance for illuminating and photographing reflecting flat areas as showing an object surface comprising a casing, a holder in the casing, a camera removably mounted on the holder, a lighting equipment in the casing, a focussing hood secured on the casing, the focussing hood serving to fix the position of the camera and the lighting equipment with respect to the flat area to be photographed and the open and free end of the focussing hood being arranged to be placed in the plane of the flat area, a wall between the hood and the casing, a pair of mirrors mounted adjacent opposite sides of the casing and behind the wall, said wall having two apertures therein in spaced relation and said openings being dimensioned so that they will limit the light crossing and each intersecting light cone being directed to the respective half of the flat area as to its light cast thereon with the light cone coming from the right illuminating the lefhand half of the area only and vice versa.

2. Appliance according to claim 1 in which the lighting equipment includes a flash tube which is of U-shape having two legs on one and the other side of a symmetrical plane, and in which a shield is provided to separate the two legs so that on each mirror only the light from one leg of the flash tube will be directed thereon.

3. Appliance according to claim 1 in which the lighting equipment includes a flash tube which is of U-shape having two legs on one and the other side of a symmetrical plane, and both legs direct light to each mirror whereby the legs mutually prevent some light of the other legs from falling on one or the other of the mirrors respectively.

4. Appliance according to claim 1 in which the lighting equipment includes a flash tube which is of U-shape having two legs on one or the other side of a symmetrical plane in the direction of an optical axis of the camera one behind the other and both direct light to the mirrors.

5. Appliance according to claim 1 in which the lighting equipment includes a flash tube which is of U-shape having two legs on one or the other side of a symmetrical plane, and in which the wall has two slits therein each directing one light cone therethrough through each of which a cone of light can pass direct onto one and the other marginal portion of the object surface.

6. Appliance according to claim 1, in which the lighting equipment is in the form of a U-shaped flash tube which is below a lens of the camera and having vertical legs.

References Cited by the Examiner

UNITED STATES PATENTS

| | | | |
|---|---|---|---|
| 1,277,110 | 8/1918 | Patterson | 240—1.4 |
| 2,015,722 | 10/1935 | Moreno | 88—24 |
| 2,481,694 | 9/1949 | Schubert | 88—24 |
| 2,590,916 | 4/1952 | Back | 95—11 |
| 2,602,370 | 7/1952 | Dodin | 88—24 |

OTHER REFERENCES

German allowed application 1,101,955, Alos, Mar. 9, 1961.

JOHN M. HORAN, *Primary Examiner.*

NORTON ANSHER, *Examiner.*